United States Patent [19]
Plummer

[11] 3,753,049
[45] Aug. 14, 1973

[54] MULTIPLE CONNECTABLE POWER OUTLET BOX WITH CONDUIT SEPARATING BAFFLES

[75] Inventor: Merle A. Plummer, North Hollywood, Calif.

[73] Assignee: Myers Electric Products, Inc., Los Angeles, Calif.

[22] Filed: Apr. 10, 1972

[21] Appl. No.: 231,256

[52] U.S. Cl............... 317/107, 317/111, 324/156, 174/68 C,
[51] Int. Cl........................................................ H02b
[58] Field of Search.................... 317/104, 105, 107, 317/111, 112, 118, 122; 174/68 C, 174/38

[56] References Cited
UNITED STATES PATENTS

| | | | |
|---|---|---|---|
| 1,916,219 | 7/1933 | Hush | 317/105 |
| 3,087,097 | 4/1963 | Janson | 317/104 |
| 2,182,603 | 12/1939 | Walker | 317/105 |
| 1,979,804 | 11/1934 | Lutz | 174/68 C |

*Primary Examiner*—J. V. Truhe
*Assistant Examiner*—Gerald P. Tolin
*Attorney*—Howard L. Johnson

[57] ABSTRACT

An electric power outlet box is used to connect either an underground or overhead supply line led into the box, and by either underground or overhead outlet conduits from the box it services the establishment of an adjacent power consumer such as a unit in a mobile home park. Top and bottom walls of the upstanding, rectangular box are each formed with a pair of actual or potential apertures, members of each pair within the box being separated by a generally vertical channel-forming baffle, each baffle spaced laterally from the adjacent side-wall of the box and inwardly terminating at a central area adjacent terminals provided for connection of the inlet and outlet lines. A circuit breaker and jaws for mounting an electric meter are part of the circuit thus formed. Incoming and outgoing conduits placed along opposite sides of a baffle are thus physically isolated in event of sparking or flame-out in the box, and thus need not be carried through opposite walls to meet safety requirements. Such box may be mounted on the side of a hollow post, through which post an underground supply conduit can be brought into the box through a knock-out aperture in the rear face in place of use of one of the other four apertures. As many of the latter as are not used to carry conduits at a particular installation, remain sealed.

5 Claims, 3 Drawing Figures

PATENTED AUG 14 1973
3,753,049
FIG.1.
FIG.3.
FIG.2.
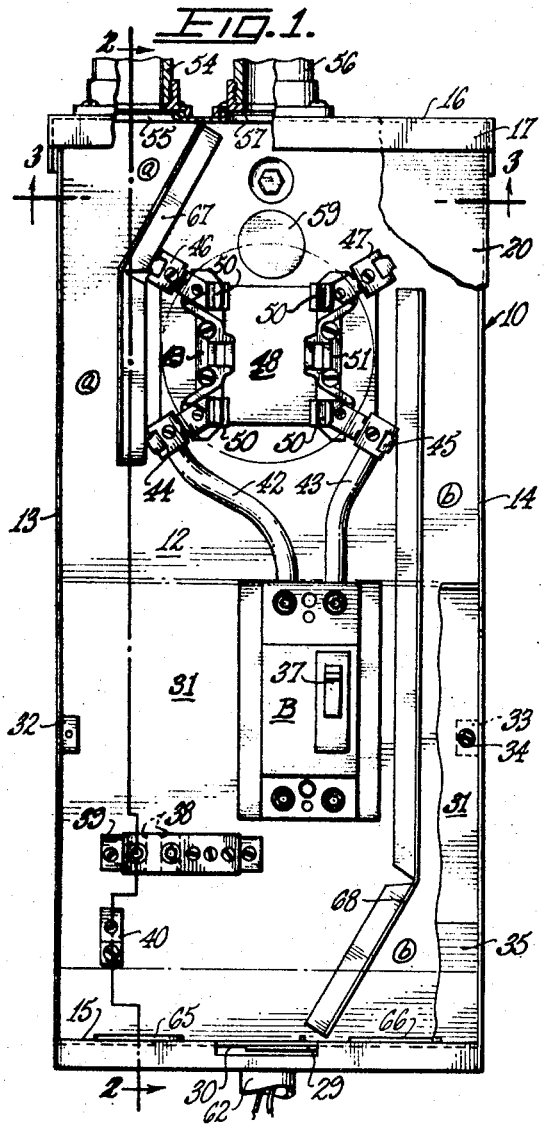
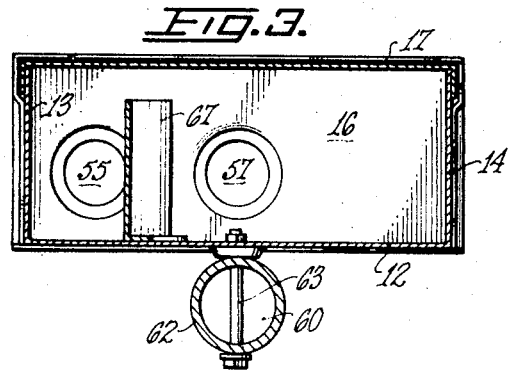
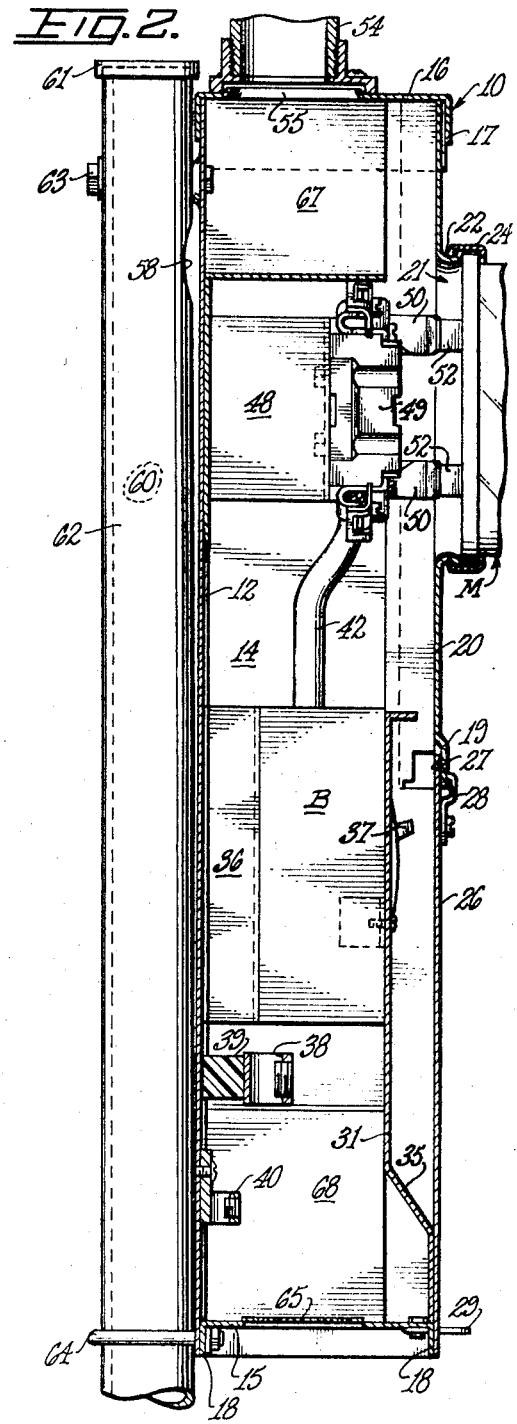

MULTIPLE CONNECTABLE POWER OUTLET BOX WITH CONDUIT SEPARATING BAFFLES

This invention relates to a power outlet box which is used to receive an electric supply conduit and to connect it to (usually) a plurality of service lines leading to an individual unit which it serves, such as a store, residence, workshop, mobile home, etc. Such box carries at least one circuit breaker and also a sealed-on meter. For such assemblies, safety regulations in most localities require that the incoming and outgoing conduits be physically isolated from each other within the box so that a possible spark or fire in one line does not automatically involve or spread to others. This could be accomplished initially by having respective lines leave and enter at opposite sides or ends of the box. However it is often more convenient or otherwise desirable to have both incoming and outgoing lines go through the same wall, as when an entering underground line is connected in the box to service conduits which are in turn led out underground, or an overhead entrance line is connected to service lines which are taken out again overhead. Since local requirements vary from place to place as well as from time to time, a box which is adapted only to one manner of connection, may be found to be unsuitable (without modification) at another location.

Accordingly, as noted in the foregoing abstract, there is here provided such an electric power outlet box which is adapted to receive and connect multiple supply and outlet conduits whether either or both are carried underground or overhead. This result is effected primarily by a structural arrangement providing a pair of side-wall apertures in each of an opposite pair of walls (such as top and bottom) of a typically rectangular housing or upright box, each pair of apertures being internally separated by a longitudinal baffle originating at the aperture wall and extending partway to the opposite wall, thus forming an open face channel along each of its sides. This provides four separate passages leading to or from a central connection area, each of which passages can thus carry a conduit which traverses the respective aperture as may be required for a particular job. Such apertures as are not used, remain closed.

Thus it is an object to provide a power outlet box or service center having a pattern of plural aperture means and aligned internal channels which can be selectively used in any combination and without further adaptation so as to accommodate the installation of electric supply line and outlet conduits, whether either or both incoming and outgoing lines are carried to and from the box underground or overhead.

The invention is illustrated by the embodiment shown in the accompanying drawings wherein FIG. 1 is a front elevational view, with portions broken away and the upper aperture hubs shown partly in axial section, of an electric power outlet box embodying the pattern of aperture and internal channel construction.

FIG. 2 is an enlarged vertical sectional view taken along the staggered line 2—2 of FIG. 1.

FIG. 3 is a transverse sectional view through the upper portion of the box along the line 3—3 of FIG. 1 with the unit rotated 180° on a vertical axis.

As here illustrated, there is provided a generally rectangular housing or box 10, in use generally placed vertically upright, and formed with back surface 12 and forward-projecting sides 13, 14, bottom 15 and top 16 walls, the top having overlying or outer turned-down edges 17 and the bottom being upwardly recessed by means of vertical margin strips 18. A forward wall 20 forms the external face for the upper portion of the box front, being centrally apertured at 21, with an arcuately outturned, annular engaging groove 22 for reception of a circular band or sealing strip 24 which serves to attach an electric meter M after the conduits have been connected.

Below the upper face 20 and in the same plane, is an upswinging closure panel 26, having its upper edge 27 receivable beneath a lower terminal lip 19 of the face 20, with a pair of upward-projecting outwardly overlying, hinge arms 28 terminally inserted in corresponding slots of the lip 19. Along the lower margin of the closure, a pivoted latch plate 29 projects horizontally through a slot 30 (FIG. 1) so as to position its outer, apertured end for insertion of a padlock or the like (not shown). Spaced inward from the closure 26 is a guard panel 31 fastened to support tabs 32, 33 by screws 34, with its lower margin angularly outslanted at 35.

A main circuit breaker B is mounted on a positioning bracket 36 so that its switch 37 will be accessible to a person upon the closure panel 26 being raised, the circuit breaker being electrically connected to a row of plug receptacles 38 which are mounted on an insulating block 39 and connected to a ground terminal 40. The receptacles 38 are arranged to be connected to such individual outlet conduits as are wired to particular electrical units (such as electric range, refrigerator, water and space heaters, air conditioner, washer-dryer, lights, etc.) in the establishment which is being serviced. It will be understood that such auxilliary elements as sub-circuit breakers and the like will also be installed in the box as required by the nature of the units being carried, the load requirements, etc.

The upper end of the circuit breaker B, by cables 42, 43, is connected to a pair of terminal lugs 44, 45 which together with an upper pair of terminal lugs 46, 47 are mounted on insulating supports 49, 51, both of which are supported on a mounting bracket 48. The mounts 49, 51 are located generally central to the upper half of the housing 10, and are positioned relative to the meter aperture 21 so that they support four thrust socket jaws 50, thus aligned to receive corresponding bayonet or prong terminals 52 projecting from the rear of the electric meter M. It will be apparent that a supply conduit from a municipal power source or the like, is intended to be accommodated by the terminal lugs 46, 47.

The top wall 16 of the box is provided with a pair of removable hubs 54, 56, mounted upstanding from corresponding apertures 55, 57, through either of which a power supply conduit may be brought in, usually the central aperture 57 being employed for the supply conduit when it is taken in from overhead. In addition, there is a "knock-out" area 59, defined by an annular line of weakness in the back wall 12, through which (alternately) such an underground power supply conduit can be inserted through a lateral opening 58 in an upright, hollow or tubular post 62 on which the box 10 is secured after the underground cable is led up through its open center 60. Such a post is provided with a removable cap 61, and an upper bolt 63 and lower encircling band 64 for fastening the outlet box. When the top wall apertures 55, 57 are not used at a particular installation, their respective hubs 54, 56 simply are not put in place, and the openings are sealed or closed by cover plates (not shown).

The bottom wall 15 is also formed with two "knock-out" apertures 65, 66, spaced apart on opposite sides of the center post 62. Within the enclosure, upstanding from the back surface 12 and spaced inward from the respective side walls 13, 14 so as to form generally vertical open face channels (*a* and *b*) extending partway along the length of each side wall starting from diagonally opposite end-corners, are a pair of generally upstanding walls or baffles 67, 68, each of which starts at an end wall 15, 16 so as to separate a pair of apertures (55,57 and 65,66) and terminates adjacent a pair of terminal lugs 44,45 or 46, 47. In their simplest form, such partition baffles may be formed by angle iron, to which is imparted an intermediate bend as required by the spacial requirements of the enclosure.

Accordingly it will be seen that actually two passageways are provided by each baffle, that is, lengthwise along its opposite sides; and each pair of possible passages is associated with a pair of apertures (which are located in opposite ends of the box so as to have the baffles originate adjacent diagonally opposite corners). The four passages thus produced can be employed to carry any combination of incoming and outgoing conduits to or from the central attachment area (which is overlaid by the meter). Or if the supply conduit is introduced by the rear-face aperture 59, any or all of the four passages and corresponding apertures can carry outgoing lines.

Thus, a supply line can be brought in underground and some or all of the service lines carried out the same way. Or a supply line can be brought in from overhead and part or all of the services lines taken out overhead. In this connection it will be realized that while the primary safety requirement is for the isolation of incoming and outgoing lines, it may also be desirable to segregate from other outgoing lines, a particular outgoing line which carries an especially heavy load. Likewise, as in a mobile home park, it may be desirable or required to have all lines underground including service lines to each mobile home; but at the same time, one may wish to take a direct line overhead to outdoor lighting fixtures. The advantage of the present power outlet box is that it is immediately adaptable to a large variety of spot requirements without any substantial alteration of the structure of the box.

For simplicity of claim terminology, the top and bottom of the box (as referred to above when illustrated in a vertical upstanding position) are also considered "side walls". The term "aperture means" refers to the four (potential) openings 55, 57, 65, 66 whether or not any or all may be temporarily closed by a cover plate or knock-out disk.

I claim:

1. An electric power outlet box, comprising walls defining an enclosure including a base surface and at least two side-walls projecting generally upright therefrom, each of which side-walls are formed with a pair of aperture means providing passage to the interior of said enclosure for an electric conduit, said enclosure having mounted therein circuit-forming elements including a circuit breaker and means for attaching an electric supply conduit which may be carried in through any one of said aperture means, terminal means for connection of outlet conduits which may be carried out through any one of said aperture means, meter connection means for detachably coupling an electric meter in position to measure current flowing in said outlet conduits, and baffle means comprising a pair of channel-forming members upstanding from said base surface, each member extending inward from a side-wall intermediate a pair of said aperture means to form adjacent open-face channels terminating adjacent said attaching means, whereby a supply conduit and an outlet conduit carried through said adjacent aperture means may be physically separated within said enclosure by location in respective channels on opposite sides of said member and any and all of said conduits may be brought through said respective apertures from either underground or overhpad positions external thereto.

2. The electric power outlet box of claim 1 wherein said two side-walls form opposite sides of a vertically disposable enclosure, with said channel-forming members each spaced laterally inward from a respective upright wall of said enclosure.

3. The electric power outlet box of claim 2 which is additionally characterized by aperture means in said base surface adapted to receive a supply conduit for connection to said attaching means.

4. The electric power outlet box of claim 3 which is mounted on a hollow post which is traversed lengthwise by an underground supply conduit which is then carried through the aperture means of said base surface and secured to said attaching means within the enclosure.

5. An electric power outlet box comprising a generally rectangular enclosure formed by a back wall, peripheral walls upstanding therefrom and a front closure, said enclosure having a central attachment area therein containing means for attachment to meter and circuit breaker units, the interior of said enclosure being characterized by a pair of baffle means upstanding from said back wall and extending inward to adjacent said central attachment area from adjacent diagonally opposite corners of the enclosure, forming open-face channels along opposite sides thereof, and a pair of aperture means formed in said enclosure walls adjacent the outer end of each of said baffle means whereby separate access may be provided to each of said channels for respective electric conduits from outside said box.

* * * * *